Figure 1:
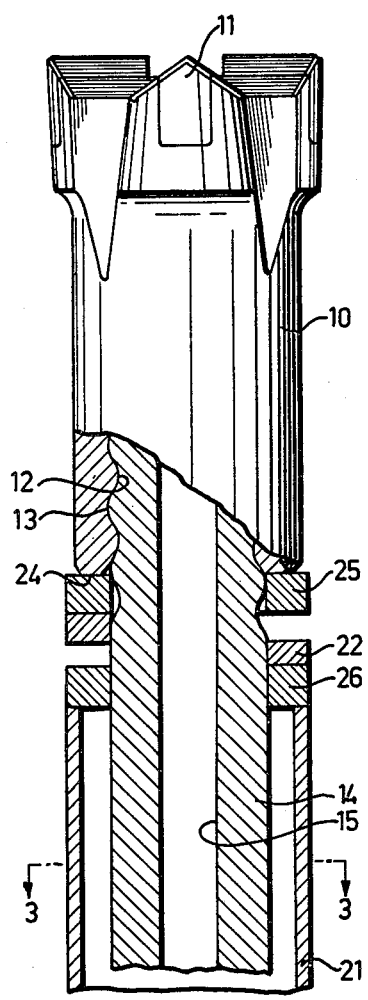

June 9, 1964     B. E. R. LÖFQVIST     3,136,377
GUIDING DEVICE FOR PERCUSSION DRILLS
Filed Oct. 9, 1961     3 Sheets-Sheet 1

INVENTOR

BY

ATTORNEY

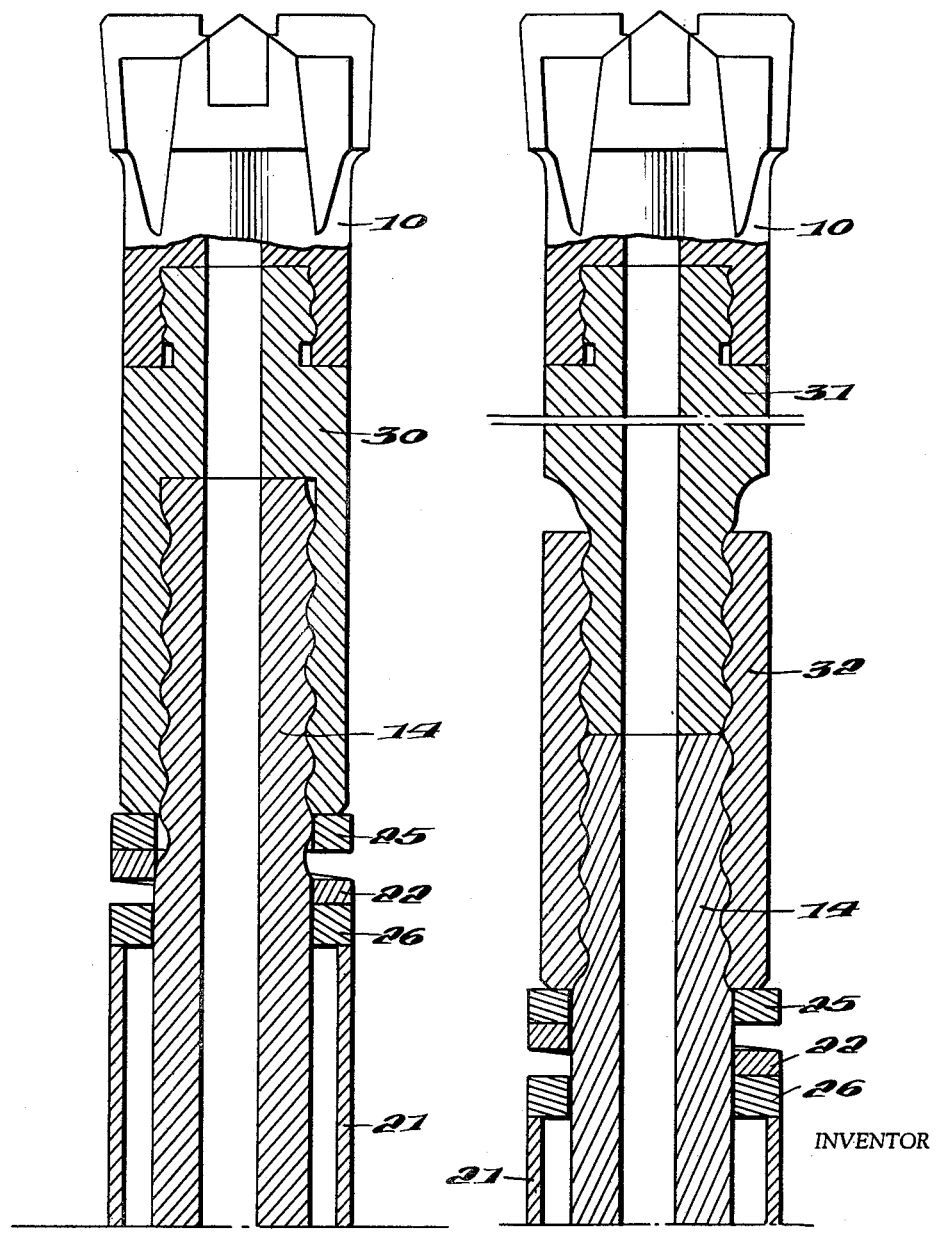

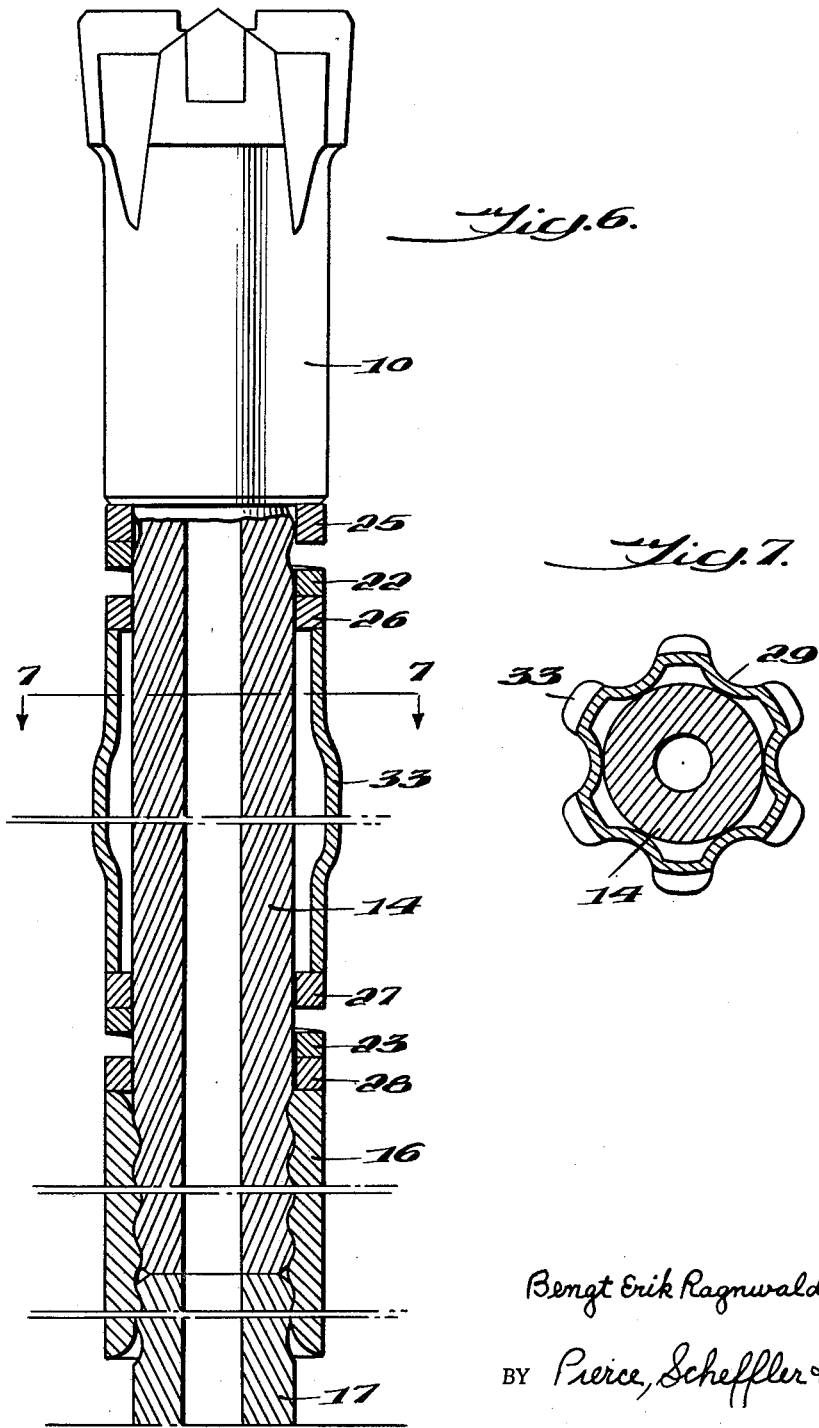

United States Patent Office 3,136,377
Patented June 9, 1964

3,136,377
GUIDING DEVICE FOR PERCUSSION DRILLS
Bengt Erik Ragnwald Löfqvist, Sandviken, Sweden, assignor to Sandvikens Jernverks Aktiebolag, Sandviken, Sweden, a corporation of Sweden
Filed Oct. 9, 1961, Ser. No. 143,969
Claims priority, application Sweden Oct. 12, 1960
5 Claims. (Cl. 175—325)

The present invention relates to a guiding device for percussion drills, especially adapted for use in connection with the drilling of long holes in rock or the like.

A difficult problem in drilling long holes either vertical or inclined is the tendency of the drill to deviate in some direction so that a curved hole is achieved. Several proposals for a solution of this problem have been made. According to one of these proposals the fore part of the drill rod is provided with a concentrically arranged guiding sleeve which is fastened to the drill rod by screws or the like. According to another proposal the guiding sleeve is movable in relation to the drill rod and according to still another proposal, especially intended for drills for horizontal or inclined holes, the fore part of the drill rod is supported by an eccentrically shaped guiding sleeve which does not follow the rotation of the drill rod and a portion of which has a radius greater than the greatest radius of the drill bit and rests against the lower side of the drill hole.

All of these proposals involve inconveniences which have prevented their universal acceptance.

The present invention solves the above mentioned problem in a simple and satisfactory way. Experiments have shown that drill holes made with percussion drills provided with the guiding device according to the present invention have a very good degree of straightness. This is the case also for very long drill holes, for instance with a length of 50 meters or more. At the same time the guiding device has been found to have a very long life, as it is formed to resist the special stresses to which it is subjected during percussion drilling, i.e. in the form of shock waves.

According to the invention the guiding device comprises a guide tube positioned substantially concentrically around a drill rod between the drill bit, a drill bit adapter or the like and an extension sleeve connecting said drill rod to the following extension drill rod. The invention is characterized further in that the guiding device comprises a guide tube provided with several grooves and ridges and with spacing means such as one or more springs or other resilient and/or elastic means placed, in relation to the drilling direction, in front of and/or behind the guide tube and serving to clamp the guide tube between the abutting surface on the drill bit or the bit adapter and the abutting surface on the extension sleeve.

By the aid of the spring or other resilient or elastic means which may be applied close to one end and preferably close to both ends of the guide tube, a suitably firm clamping of the guide tube in relation to the drill rod is achieved, so that the guide tube normally rotates with the drill rod. If during the drilling some obstacle to the rotation of the guide tube together with the drill rod should occur, the drilling may go on without extracting the drill rod for removal of the obstacle because the drill rod can be rotated independently of the guide tube by overcoming the clamping force holding the guide tube with respect to the drill rod. The guide tube may reciprocate with respect to the drill rod only to the extent permitted by the free space between one end of the guide tube and the adjacent end of the drill bit or drill bit adapter or between the other end of the guide tube and the adjacent end of the extension sleeve or both.

This has not been possible in earlier constructions comprising guide tubes which are rigidly connected to the drill rod.

The spacing means such as a spring or other resilient and/or elastic means, which causes the clamping of the guide tube, absorbs the shock waves from the percussion drilling so that only an insignificant part thereof affects the guide tube. With respect to the fact that the shock waves come from both directions the spring or other resilient and/or elastic means preferably is arranged at both ends of the guide tube, but in certain cases it will be sufficient to have one or more such means at one end of the guide tube. By the aid of a resilient or elastic clamping of this kind a very long life of the guide tube is achieved and the wear of especially its end parts will be very insignificant.

Figure 2:
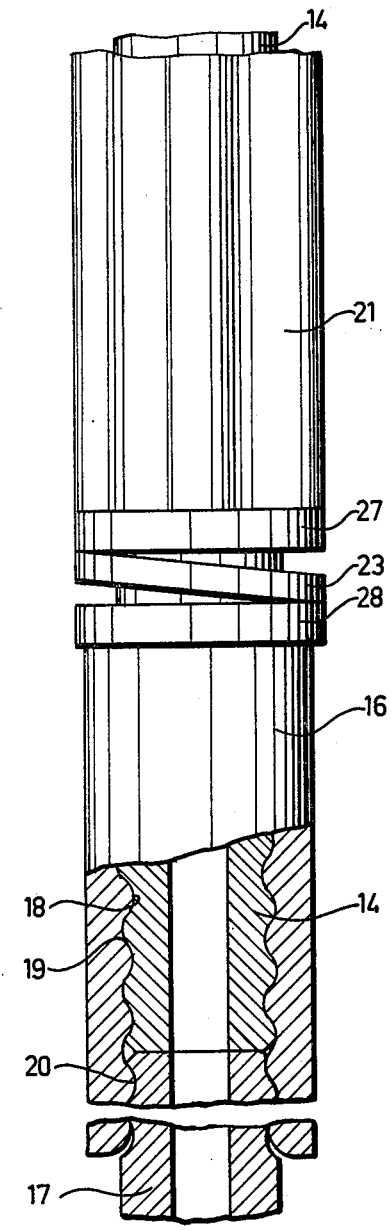
Figure 3:
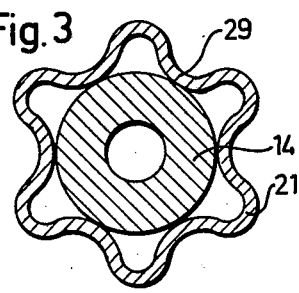

The invention will now be more fully described in connection with the accompanying drawings in which:

FIGURES 1 and 2 show two adjacent parts of a percussion drill for long hole drilling provided with an embodiment of the guide device according to the invention, FIGURE 3 shows a section along the line 3—3 in FIGURE 1, FIG. 4 is a longitudinal section showing one form of adapter, FIG. 5 is a longitudinal section showing a second form of adapter, FIG. 6 is a longitudinal section showing a modified form of guide tube, and FIG. 7 is a cross sectional view on the line 7—7 of FIG. 6.

In the drawings reference numeral 10 refers to a percussion drill bit suitably provided with a cutting surface having cutting inserts of sintered carbide 11. The drill bit 10 has a sleeve shaped end portion provided with inner threads 12, e.g. round threads, for attaching it by means of corresponding outer threads 13 to the drill rod 14. The drill rod 14, which as a rule has a hole 15 for a flushing medium, is at the end opposite to the drill bit connected to a following extension drill rod 17 by means of an extension sleeve 16. The extension sleeve 16 may, as is shown in FIG. 2, like the drill bit be provided with inner threads 18, e.g. round threads, and the end parts of the drill rods 14 and 17, which are surrounded by the extension sleeve 16, may have corresponding outer threads 19 and 20.

Instead of being fastened directly to the drill rod 14 as shown in FIGS. 1 and 2 the drill bit 10 may as shown in FIG. 4, be fastened to the drill rod 14 through an intermediate adapter 30 or as shown in FIG. 5 the drill bit 10 may be connected to the drill rod 14 through an intermediate adapter 31 and a coupling sleeve 32. As appears from FIGS. 4 and 5 the drill bit adapter is a short interconnecting piece externally threaded at one end to engage the drill bit and having an internally threaded sleeve at the other end to engage the drill rod (FIG. 4) or externally threaded at one end to engage the drill bit and externally threaded at the other end to engage a coupling sleeve (FIG. 5).

FIGURES 1 and 2 show the foremost and the next following part of a percussion drill with a guiding device according to the invention. As appears from the figures the guiding device comprises a guide tube 21 provided with preferably several grooves or ridges and one or more spring or other resilient and/or elastic means 22, 23. The guide tube 21 and preferably also the spring or other resilient and/or elastic means 22, 23 should in this connection be situated in the main concentrically around the drill rod 14 between the drill bit 10 and the extension sleeve 16, which connects the extension drill rod 17, and which naturally can be made in another way than is shown in the drawing. The guide tube or sleeve 21 should have a length, which is slightly shorter than the distance between the drill bit 10 and the extension sleeve 16 connecting the drill rod 10 to a following extension drill rod 17. By the aid of the spring or other resilient and/or elastic means 22, 23, which suitably are situated close to one or both ends of the guide tube 21, the guide tube is clamped with a suitable force between the abutting surfaces on the drill bit 10 and the extension sleeve 16, so that the guide tube during the drilling normally follows the rotation of the drill rod. At least one spring or other resilient and/or elastic means, e.g. a spring washer, a rubber packing or the like should be placed between the abutting surface 24 on the drill bit and the fore end of the guide tube 21 in relation to the drilling direction and/ or at least one such means between the abutting surface on the fore end of the extension sleeve 16 and the rear end of the guide tube 21. As a rule it is suitable to place at least one such spring or other resilient and/or elastic means close to each end of the guide tube in order that the main part of the shock waves, which are caused by the percussion drilling and move in both directions of the drill, is absorbed in the said means, which results in a substantially increased life of the guiding device.

In order to achieve a suitable clamping of the guide tube between the abutting surface on the drill bit and the abutting surface on the extension sleeve and furthermore to protect the ends of the guide tube against wear one or more spacing washers 25, 26, 27, 28 e.g. annular or in the main annular shaped washers of hardened steel are placed around the drill rod preferably in contact with one or both sides of the spring or other resilient and/or elastic means 22 and 23. As a rule at least one such spacing washer should be placed on each side of the spring or other resilient and/or elastic means, so that one or both ends of the guide tube and the abuttting surface on the drill bit and/or abutting surface on the extension sleeve rests against said spacing washers. Thus in the main annular shaped spacing washers or the like should be placed around the drill rod between one or both ends of the guide tube and the abutting surface opposite to its respective end. Preferably these spacing washers should surround the spring or other resilient and/or elastic means on both sides.

The guide tube 21 is provided along its outer peripheral surface with one or perferably more grooves 29, which during the drilling guide the cuttings (detritus) rearwardly in a direction opposite to the drilling direction. As a rule the grooves and associated ridges are placed in the main parallel with the drilling axis, but they can of course also be situated in spiral (screw) form, in which latter case it is possible to provide the guide tube with one single groove or ridge. Usually the number of grooves or ridges should be at least two and preferably from three to six. It is especially advantageous to make the guide tube with a relatively thin wall and in cross section in the main waveformed or corrugated as appears from FIGURE 3. In such waveformed or star-like guide tubes the tops of the ridges and the bottoms of the grooves should have a rounded shape. Among the advantages can be mentioned that the guide tube made in this way may be of relatively light weight and at the same time is easy to manufacture. Furthermore the centering of the tube in relation to the drill rod does not present any difficulties.

The guide tube serves for guiding the drill rod in relation to the walls of the drill hole during the drilling and has an outer diameter or radius which is slightly smaller than the greatest diameter or radius of the drill bit. In other words the circumscribed circle or cylinder of the guide tube, which latter is applied concentrically or in the main concentrically on the drill rod, should be slightly smaller than the greatest diameter of the drill bit.

The drill rod 14 is preferably made with a circular cross section but may in certain cases also have a polygonal cross section e.g. four- or six-sided. The guide tube should have such an inner section that it easily can be passed on to the drill rod at the same time as it is centered in relation to the drill rod. As a rule the smallest inner diameter of the guide tube should be slightly greater than the greatest outer diameter of the drill rod.

As an example of the use of the guide device according to the invention the following is stated.

A star or wave formed guide tube was placed on the first drill rod between a 2″ percussion drill bit and the first extension sleeve. The length of the guide tube was slightly shorter than the distance between the drill bit and the extension sleeve. In order to protect the star or wave shaped guide tube and its ends against wearing, shock absorbers were placed between the bit and the guide tube and between the guide tube and the extension sleeve. The shock absorbers consisted of two or more hardened steel rings or distance washers between which a spring or other resilient and/or elastic means has been placed. As spring or other resilient and/or elastic means were used one or more substantially annular spring washers of hardened steel, which for instance at one point were cut open. Alternatively were also used bushings of rubber or similar resilient (elastic) material. In drilling 2″ holes having a length of 50 meters with the above mentioned percussion drill provided with the guide device according to the invention the holes produced had a very good degree of straightness along their whole lengths.

As shown in FIGS. 4 and 5 the drill bit may be connected to the drill rod through an adapter 30 (FIG. 4) or an adapter 31 and coupling sleeve 32 and in such a structure the spring 22 and the washers 25 and 26 will be positioned between the end of the guide tube 21 and the adjacent end of the adapter 30 (FIG. 4) or the adjacent end of the coupling sleeve 32 (FIG. 5).

As will be seen from the foregoing disclosure it is immaterial whether the guide tube is positioned between the drill bit proper and the coupling sleeve or between a drill bit adapter and a coupling sleeve or between two coupling sleeves and for this reason, in the appended claims the term drill bit is intended to embrace a drill bit proper and a drill bit-adapter combination.

The length of the guide tube should be about the same as the length of an extension drill rod minus the length of an extension sleeve. The diameter of the guide tube depends on the diameter of the drill rod, and the outer diameter of the tube is generally slightly less than twice the diameter of the drill rod. The diameter of the guide tube may along short parts at its ends be slightly smaller than along the main and central part of the tube. This can for the embodiment of FIGURE 3 be achieved by forging the outer tops of the waves to a slightly smaller radial height while the bottom of the grooves 29 remain unchanged. In this way smaller washers 26 and 27 can be used and the cuttings (detritus) get a more free passage along the tube.

This modification is shown in FIGS. 6 and 7 in which it appears that adjacent to each end of the guide tube the ridges 33 are flattened.

I claim:

1. A percussion drill comprising a drill bit having a cutting surface at one end thereof, a first annular surface perpendicular to the axis of said bit and secured in fixed relation to but at a substantial distance from and facing away from said cutting surface, a drill rod of circular cross section and of substantially the same outer diameter as the inner diameter of said first annular surface connected to said drill bit, an extension drill rod of the same circular cross-section as said drill rod and positioned end to end to said drill rod, an extension sleeve connecting the adjacent ends of said drill rod and said extension drill rod, said extension sleeve having a second annular surface of substantially the same size as said first annular surface and perpendicular to the axis of said drill bit at a substantial distance from and facing toward said first annular surface, a guide tube positioned around said drill rod between said first and second annular surfaces, said guide tube having end surfaces perpendicular to the axis of the bit, the length of said guide tube between said end surfaces being substantially less than the distance between said first and second annular surfaces thereby leaving a space between each of said end surfaces of said tube and the adjacent first and second annular surfaces, at least one washer partially but not completely filling each of said spaces, said washers each having annular opposite surfaces perpendicular to the axis of said bit and of substantially the same size as said first and second annular surfaces, said end surfaces of said guide tube having substantially the same internal and external dimensions as the annular surfaces of said washers, said guide tube being symmetrical in all directions and having a maximum outer diameter less than the greatest diameter of the drill bit and a smallest inner diameter greater than the greatest outer diameter of said drill rod and at least a substantial portion of the wall of said guide tube being bent to form a plurality of alternate, longitudinally extending external and internal grooves and ridges.

2. A percussion drill as defined in claim 1 in which at least the middle portion of said guide tube has a substantially constant wall thickness and is wave shaped in cross section.

3. A percussion drill as defined in claim 1 in which at least one of said washers is a spring washer.

4. A percussion drill as defined in claim 3 comprising a plane washer on at least one side of said spring washer.

5. A percussion drill as defined in claim 3 in which said spring washer is sandwiched between two plane washers.

References Cited in the file of this patent

UNITED STATES PATENTS

| 1,745,351 | Bishop | Feb. 4, 1930 |
| 2,061,057 | Bigler | Nov. 17, 1936 |
| 2,072,320 | Thomas | Mar. 2, 1937 |
| 2,742,265 | Snyder | Apr. 17, 1956 |
| 2,815,930 | Storm | Dec. 10, 1957 |

FOREIGN PATENTS

| 206,517 | Germany | Feb. 6, 1909 |
| 964,311 | Germany | May 23, 1957 |
| 170,242 | Sweden | Feb. 2, 1960 |